United States Patent
Moors et al.

(10) Patent No.: US 11,620,112 B2
(45) Date of Patent: Apr. 4, 2023

(54) INTEGRATED SIMULATION CODE AND PRODUCTION CODE GENERATION

(71) Applicant: dSPACE digital signal processing and control engineering GmbH, Paderborn (DE)

(72) Inventors: Sebastian Moors, Paderborn (DE); Renata Hein, Paderborn (DE); Ulrich Eisemann, Muelheim (DE)

(73) Assignee: dSPACE GmbH, Paderborn (DE)

( * ) Notice: Subject to any disclaimer, the term of this patent is extended or adjusted under 35 U.S.C. 154(b) by 0 days.

(21) Appl. No.: 17/079,003

(22) Filed: Oct. 23, 2020

(65) Prior Publication Data
US 2021/0124563 A1   Apr. 29, 2021

(30) Foreign Application Priority Data

Oct. 24, 2019 (EP) .................................... 19205062

(51) Int. Cl.
*G06F 8/35* (2018.01)
*G06F 8/41* (2018.01)

(52) U.S. Cl.
CPC .............. *G06F 8/35* (2013.01); *G06F 8/443* (2013.01)

(58) Field of Classification Search
CPC ....... G06F 11/3696; G06F 8/35; G06F 8/3443
See application file for complete search history.

(56) References Cited

U.S. PATENT DOCUMENTS

| | | | |
|---|---|---|---|
| 7,742,903 B2 | 6/2010 | Ciolfi et al. | |
| 8,494,832 B2* | 7/2013 | Krishnan | G06F 11/3696 703/22 |
| 9,678,775 B1* | 6/2017 | Grover | G06F 9/45537 |
| 2004/0154003 A1* | 8/2004 | Oi | G06F 8/35 714/38.1 |
| 2006/0010429 A1 | 1/2006 | Ihara | |
| 2013/0125092 A1* | 5/2013 | Liu | G06F 8/60 717/108 |
| 2019/0370420 A1* | 12/2019 | Feng | G06F 30/20 |

OTHER PUBLICATIONS

K. Kubíček, M. Čech and J. Škach, "Continuous enhancement in model-based software development and recent trends," 2019 24th IEEE International Conference on Emerging Technologies and Factory Automation (ETFA), Zaragoza, Spain, 2019, pp. 71-78, doi: 10.1109/ETFA.2019.8869237. (Year: 2019).*

* cited by examiner

*Primary Examiner* — Hanh Thi-Minh Bui
(74) *Attorney, Agent, or Firm* — Muncy, Geissler, Olds & Lowe, P.C.

(57) ABSTRACT

According to the invention, simulation code and production code are generated as source code from a model. The model comprises one or more blocks which specify a desired behavior of a program, in particular a control program. At least one of the blocks is marked with a simulation code attribute. Simulation code is generated for those blocks that include a simulation code attribute. Production code is generated for all other blocks. The generated source code includes both simulation code and production code. The simulation code portions are contained in the source code in a separable manner from the production code portions.

19 Claims, 10 Drawing Sheets

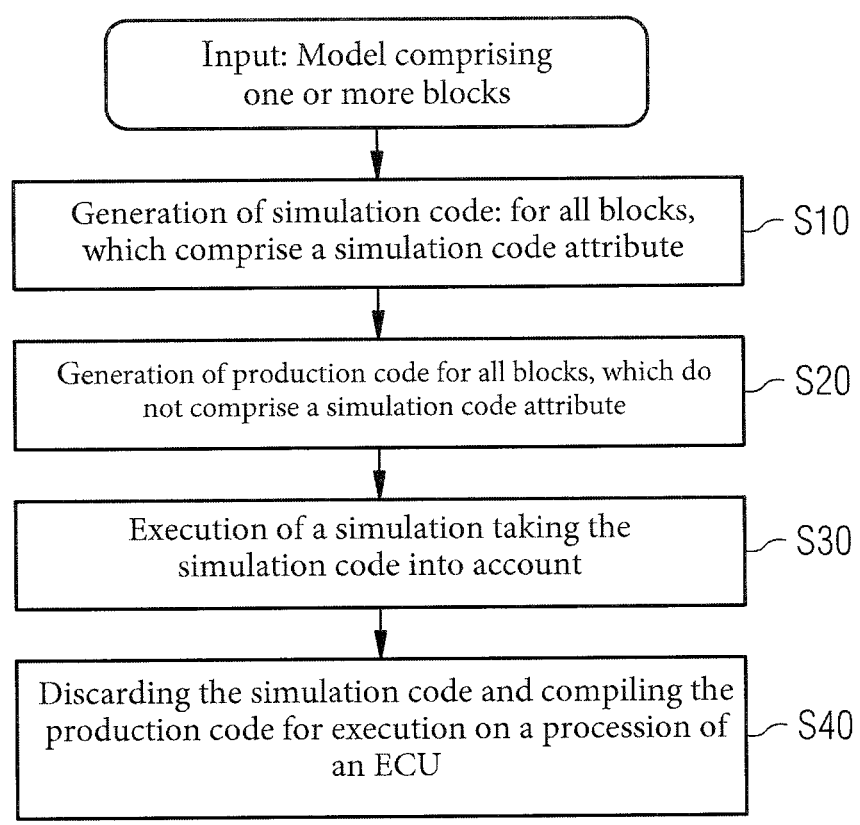

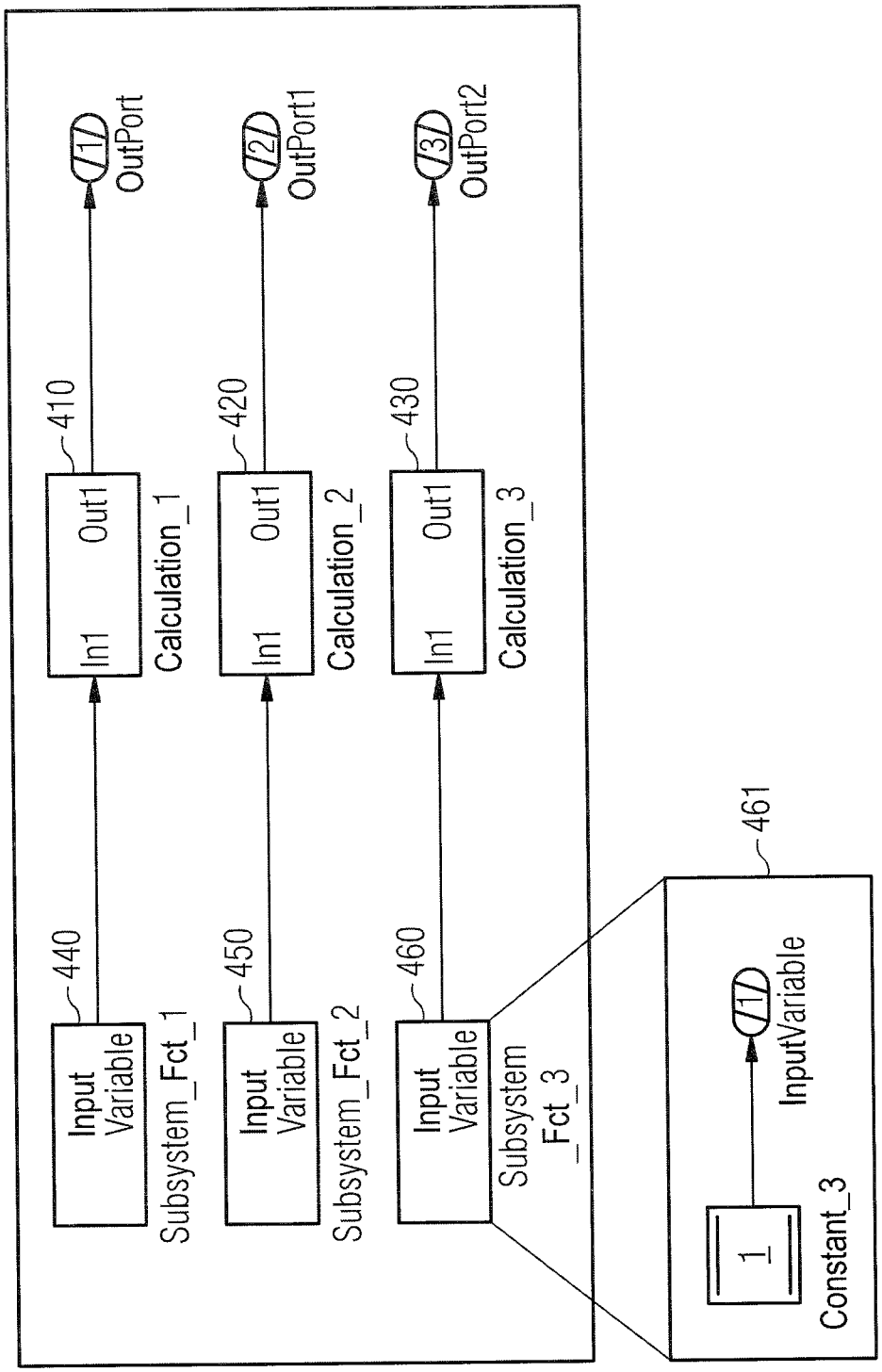

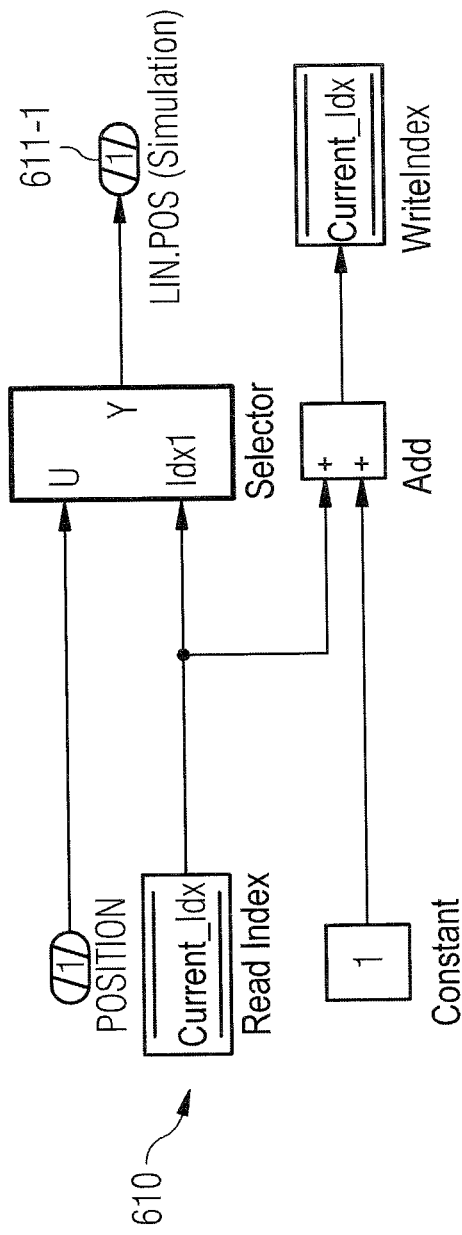
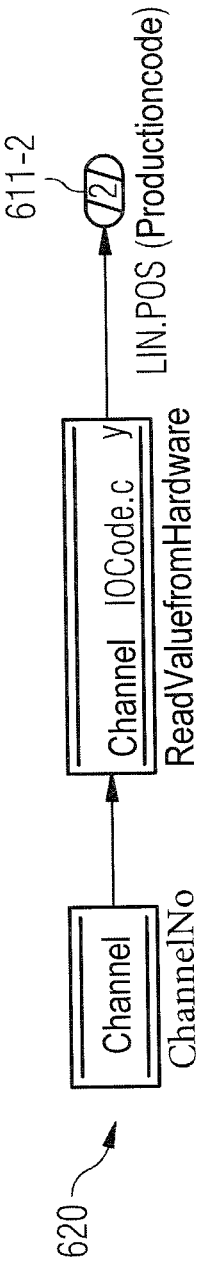
FIG 6B

INTEGRATED SIMULATION CODE AND PRODUCTION CODE GENERATION

This nonprovisional application claims priority under 35 U.S.C. § 119(a) to European Patent Application No. 19205062.3, which was filed in Europe on Oct. 24, 2019, and which is herein incorporated by reference.

BACKGROUND OF THE INVENTION

Field of the Invention

The present invention relates to the model-based development and model-based testing of programs, in particular control programs for control units. In particular, the present invention relates to a method and a code generator for generating source code from a model of a program, for example a control program, wherein the source code comprises both simulation code portions for testing the model and production code portions executable on the control device. Furthermore, the invention relates to a test environment for testing models for control programs.

Description of the Background Art

Model-based development and model-based testing of technical systems has become established in many development processes across many applications, such as the development of control programs, in particular for control units in the automotive sector. Model-based development offers the possibility to graphically model technical systems on a high abstraction level instead of having to program them. The actual source code is no longer programmed manually, but is generated largely automatically from the model, which means that the focus of development is no longer on the code but on the model.

Production code generation is the logical step for converting models into efficient, production-ready code. One example of such a model-based environment is TargetLink. TargetLink generates highly efficient production code as C code directly from MATLAB/Simulink or Stateflow and allows for early verification by integrating simulation and testing. TargetLink supports efficient modular development, is certified for ISO 26262, ISO 25119 and IEC 61508, and offers powerful native AUTOSAR support.

Although automatic code generators reduce the error rate as compared to manual programming, both the generated code and the underlying specification or model must be tested.

The control programs developed in the above manner are usually not stand-alone programs, but interact with external components (software and/or hardware components).

For example, in the development of AUTOSAR software, it can happen that a first runnable of a software component (SWC) exchanges data with a second runnable, wherein the second runnable can be located within the first SWC or in a second SWC. Parallel execution of the two runnables can cause side effects that are currently not covered in Simulink. Because the external software components are often only available in later development phases, early testing of the control program is not possible or only possible to a limited extent.

Hardware-dependent technical effects resulting from the interaction of the production software with external hardware components are usually not covered in the model at an early stage of development. Here, too, the development and realization of the external hardware components is not known, which makes early testing of the production software impossible or only possible to a limited extent.

In order to achieve a test with appropriate coverage at an early stage, there should be possibilities to inject "external" signals within a model, so that a parallelism of execution under emulation of external components can be simulated by modeling side effects resulting from the interaction with external components in a targeted manner. In addition to the possibility of feeding external signals into the model for test purposes, it is also desirable to "tunnel" or hide signal values from the model, in particular if missing model and code portions are realized for test purposes by "stubs", which have to be simulated in a suitable way during the simulation.

SUMMARY OF THE INVENTION

In this respect, the object of the present invention is to provide a modeling and test environment that overcomes the above mentioned disadvantages.

The invention is based on the realization that this object can be achieved by attributing individual blocks as simulation code. The blocks attributed as simulation code can be placed at different locations next to the production code blocks. Depending on the attribution, the code generator then generates production code or simulation code from the corresponding block or group of blocks. Thus, both production code and simulation code can be generated from an existing model in a single run. The simulation code is temporarily used for test purposes and can be removed from the production code before the latter is compiled and executed on the ECU.

This object is achieved by a method, a code generator and a test environment according to the independent claims. The dependent claims specify advantageous embodiments and further developments of the invention.

In a first aspect of the invention, a method for generating source code from a model is provided. The model comprises one or more blocks which specify a desired behavior of a program, in particular a control program. At least one of the blocks is marked with a simulation code attribute. Simulation code is generated for those blocks that include a simulation code attribute. Production code is generated for all other blocks, i.e. those blocks that do not have a simulation code attribute. The source code generated in this way includes both simulation code portions and production code portions. The simulation code portions can be separated from the production code portions in the source code.

By providing model blocks with an additional attribute as simulation code blocks, such attributed blocks can be used for simulation. When generating source code, however, the simulation code is output separately from the production code. Thus, the user can emulate a substitute behavior of external components by inserting correspondingly attributed blocks in the model, thus enabling testing of the model with high coverage.

Thus, the method according to the invention makes it possible to inject a test signal into the model or to trigger a change of a data element between two calls of an AUTOSAR runnable. Furthermore, changes within a time step or the occurrence of interrupts can be modeled with simulation code blocks. Since these portions of the generated source code are separate from the production code portion, the generated production code can also be used in the ECU without the need for re-generation of code or modification of the model.

The method according to the invention provides a modeling environment which enables the simulation and testing of models for production code, in particular for production code, which is linked in a technical system, for example an ECU, with external software and/or hardware components, the exact implementation of which is only determined at a later point in time.

The method according to the invention makes it possible to generate both simulation code and production code within a single run of the code generator.

Preferably, the simulation code is integrated into the source code by means of preprocessor directives.

By integrating the simulation code by means of preprocessor directives in the source code, such as by means of a preprocessor macro, the corresponding directives can be inserted and/or maintained or removed by a preprocessor at the corresponding locations in the source code. Thus, the simulation code portions can remain in the complete code—parenthesized by preprocessor directives—and are only removed during the compilation for the ECU. This ensures that the code generation for the production code is as identical as possible to the test version, thus ensuring consistent behavior both during simulation and for the final production code on the ECU.

The separable integration of simulation code and production code in the source code can be realized, for example, by using constructs of conditional compilation. For example, the #ifdef directive can be used to parenthesize an implementation of an external function and thus remove it from the source code without leaving any residues. Other well-known preprocessor directives such as #include or #define can also be used for this purpose.

The above procedure ensures that the simulation code always remains in place and is only discarded when compiling the production code.

Preferably, the simulation code can be stored separately from the production code in a code module or code file.

By shifting the simulation code portions into separate modules, a separation between simulation code and production code can already be realized on file level. This avoids the risk of inconsistencies in code generation, since a single run of code generation is sufficient to generate both code for Software-in-the-Loop simulation and code for use in the final ECU. Furthermore, the clear separation of both code portions ensures that no simulation code portions are included in the final production code.

Preferably, the method further comprises the step of performing a simulation, in particular a Software-in-the-Loop simulation, taking into account the simulation codes.

A Software-in-the-Loop simulation enables fast and efficient testing of the production code.

Preferably, a Model-in-the-Loop simulation can be performed for the entire model or for specific model blocks. With a Model-in-the-Loop simulation, correctness can be verified at the model level, i.e. it can be verified whether the blocks executed during the simulation actually describe the intended behavior of the control program. Furthermore, a first part of the model can be simulated in a Model-in-the-Loop mode, e.g. to describe a controlled system, while simultaneously a second part of the model is simulated in a Software-in-the-Loop mode. The second part can contain production code and/or simulation code.

Preferably, the method further comprises the step of discarding the simulation code and compiling the production code for execution on a processor, in particular on a processor of an ECU. Execution can be performed at any time, provided that the compiled code is first stored in a non-volatile memory of the ECU.

Preferably, a block marked with a simulation code attribute includes at least one additional attribute that is taken into account when generating simulation code. Thus, several attributes can be used to differentiate the simulation code portions according to their purpose, so that e.g. logging (read value) or value specification (write value) can be distinguished. Thus, variants or different types of simulation code can be distinguished within the simulation code. In particular, signal injection, debug/assert and logging can be distinguished depending on the function. In this case it can also be provided to switch on only the simulation code for logging blocks, for example. A flexible and efficient simulation is thus achieved.

Preferably, the step of generating simulation code includes a code optimization step considering at least one additional attribute. Thus, simulation code attribute(s) can be read out to set properties (in particular regarding the optimization of the code) during code generation accordingly. For example, the simulation code can be optimized for readability, in particular by not eliminating variables.

Preferably, a block is given a simulation code attribute if the block specifies an aspect of a component interacting with the program and/or external influences on the program, wherein the simulation code generated from the block emulates the aspect of the component and/or the external influences on the program. Such a block can thus model the behavior of an external component but also arbitrary external influences on the program. In addition, a group of blocks can model the behavior, in which case each individual block would be attributed as a simulation code block.

Preferably, the step of generating simulation code includes the generation of a stub function from the specified behavior of the component, wherein the stub function emulates the component interacting with the program by means of the corresponding simulation code.

The additional attribution of the blocks as simulation code blocks can preferably be used to simulate a component, for example an SW component executed in parallel, an I/O driver, the concrete implementation of which is initially unknown and is only determined in a later development phase. In other words, a block or group consisting of a plurality of blocks will replace a component. For example, this could be a block for modifying a variable value ("Data Store Write", DSW), which emulates/models a replacement behavior of an SW component, which changes the values of certain program variables, or also a block that models a call of a software component. This allows for a simulation of the program to be performed even if the software environment in which the program is executed has not yet been implemented.

In software development, a stub function refers to a program code that is used instead of another program code. The actual program code, which is replaced by the stub, has not yet been developed. The stub function thus emulates a replacement behavior of a component that interacts with the program. By emulating a component with a stub function, a rudimentary behavior of the component is thus described in the model. This allows for testing of the production code in an early development phase, in which the exact implementation of the component is not yet known. For example, an I/O driver can be temporarily considered for simulation purposes by the generated stub function.

Preferably, the step of generating simulation code includes the generation of function calls to transform an input signal. The function calls can model different algorithms which transform the input signal. Thus, input signals whose values change within a sampling step can be simulated efficiently.

By inserting correspondingly attributed blocks in the model, a test signal can be injected in order to change variables and/or parameters of the model from the outside. Thereby, the signal injection is carried out via the block attributed as simulation code, whereas the signal injection is not indicated by signals. The signal injection can also be used, for example, to specify a value for the production code by means of a constant block. In this case, the block attributed as simulation code has only one output.

Preferably, the simulation code replaces function calls to assign a value to a local variable occurring in the production code. The value assignment can include both an initialization and a modification of an existing value.

This provides a flexible simulation environment that allows for flexibly changing the value of a variable and/or parameter in each simulation step.

Preferably, the simulation code contains a global simulation variable whose value is determined by a value of a local variable calculated in the production code. This allows for measuring or logging of the signal for later evaluation or debugging.

Preferably, the production code contains a local variable whose value is determined by a value of a global variable calculated in the simulation code. This allows for reading or writing of local variables.

Preferably, the simulation code comprises an initialization module, which initializes parameters and/or variables of the emulated component, and a function module, which contains functions, in particular stub functions, of the emulated component, wherein function calls (e.g. one or more stub functions) are made in the production code.

Preferably, the initialization module comprises an index-based data structure, in particular an array, wherein the data structure defines a plurality of values of a variable, wherein in each function call of a stub function in the production code, individual values of the variable are accessed via the index.

By using an index-based data structure, multiple calls to a component in the simulation code can be efficiently designed.

To ensure that the modeling of the test cases runs as smoothly as possible, a correctness verification is expediently carried out. The model is considered to be correct if a continuous signal line within a hierarchy level has matching markings of the blocks as simulation code blocks, i.e. blocks whose simulation code attributes are set. A signal line refers to the signal line known from Simulink, for example, which connects the output of a first block to the input of a subsequent second block and indicates that the signal input of the second block depends on the signal output of the first block. If the first block is marked as a simulation block, the second block would also have to be attributed as such, since both blocks model aspects of the equivalent behavior of an external component.

Preferably, the method further comprises the steps of verification, starting from a first block comprising a simulation code attribute, whether all consecutive blocks along a simulation line starting from the first block comprise simulation code attributes, and generating an error message if the simulation code attribute of a block is not set. The verification can stop at a block along the simulation line marked as a transition block.

A simulation line can correspond to a signal line known from Simulink that connects blocks within a hierarchical level. This ensures that signal connections occur only between simulation code portions (these can generally be in different subsystems). This avoids hard-to-find errors if individual components are not marked as simulation code and therefore, for example, a value assignment remains incorrectly in the production code.

In addition, it can also be provided that blocks along simulation or signal lines that erroneously do not have a simulation code attribute are automatically assigned one.

For ease of use, it can also be provided that a group of blocks is selected and the simulation code attribute is set the same for all selected blocks. Alternatively, it is also conceivable to perform backpropagation starting from a target block marked as simulation code (or the output port linked to the input to be stimulated). In this case, all blocks processed are marked as simulation code blocks until a block is reached that marks a boundary.

Preferably, certain blocks, also called transition blocks, which have been assigned a fixed default property as production code blocks, can form a boundary between simulation and production code portions in the model.

Transition blocks can be selected from the TargetLink block library, for example, and can contain additional data for code generation, such as the scaling information for fixed point variables, variable classes, variable names, etc. For code generation, all production code blocks can be provided with individual scaling. These blocks then also contain the additional data for code generation mentioned here. In particular, block libraries can contain predefined composite blocks.

However, it is also conceivable to mark the border between the simulation and production portions without dedicated transition blocks, for example by regarding an in-port or an out-port as a transition block. For better readability, however, the use of a dedicated transition block is advantageous.

According to a second aspect, the invention relates to a code generator for generating source code from a model, wherein the model comprises one or more blocks specifying a desired behavior of a program, in particular a control program. At least one of the blocks is provided with or attributed a simulation code attribute. The code generator is set up to generate simulation code for blocks that include a simulation code attribute and to generate production code for blocks that do not include a simulation code attribute. The source code contains the simulation code and the production code, wherein the simulation code is separable from the production code.

According to a third aspect, the invention relates to a test environment for testing models for control programs, wherein a model comprises one or more blocks specifying a desired behavior of a control program. At least one of the blocks is provided with or attributed a simulation code attribute. The test environment comprises a code generator according to the second aspect, and a simulator, wherein the simulator is adapted to perform a simulation, in particular a Software-in-the-Loop or Model-in-the-Loop simulation, taking into account the blocks with simulation code attribute.

For the generation of simulation code, code generators can be used, as are usually used for production code generation. However, it should be possible not to optimize simulation code in the same way as production code, e.g. because it is not always useful to "optimize away" variables. Code generators with flexible optimization options allow for distinguishing, for example, whether a variable may be omitted or not. The simulation code attribute allows for a predefined set of optimization options to be selected. In conjunction with this, different optimizations can be applied within the simulation code. For example, certain variables related to measured variables can play an important role in prototyping and should therefore be considered in the simulation code. For an optimization of the simulation code, the focus could therefore be more on readability, and less on maximum execution speed, as is usually the case for production code.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 2 is a block diagram of the method of generating source code according to the invention, comprising simulation code and production code;

FIGS. 4A, 4B, 4C and 4D show an embodiment for signal manipulation, in which a value is to be read from a memory location, which can be changed by external processes;

FIGS. 6A and 6B show an embodiment of the invention for emulating several calls to a software component.

The same reference signs and designations are used in the different drawings for the same elements.

DETAILED DESCRIPTION

Figure 1:
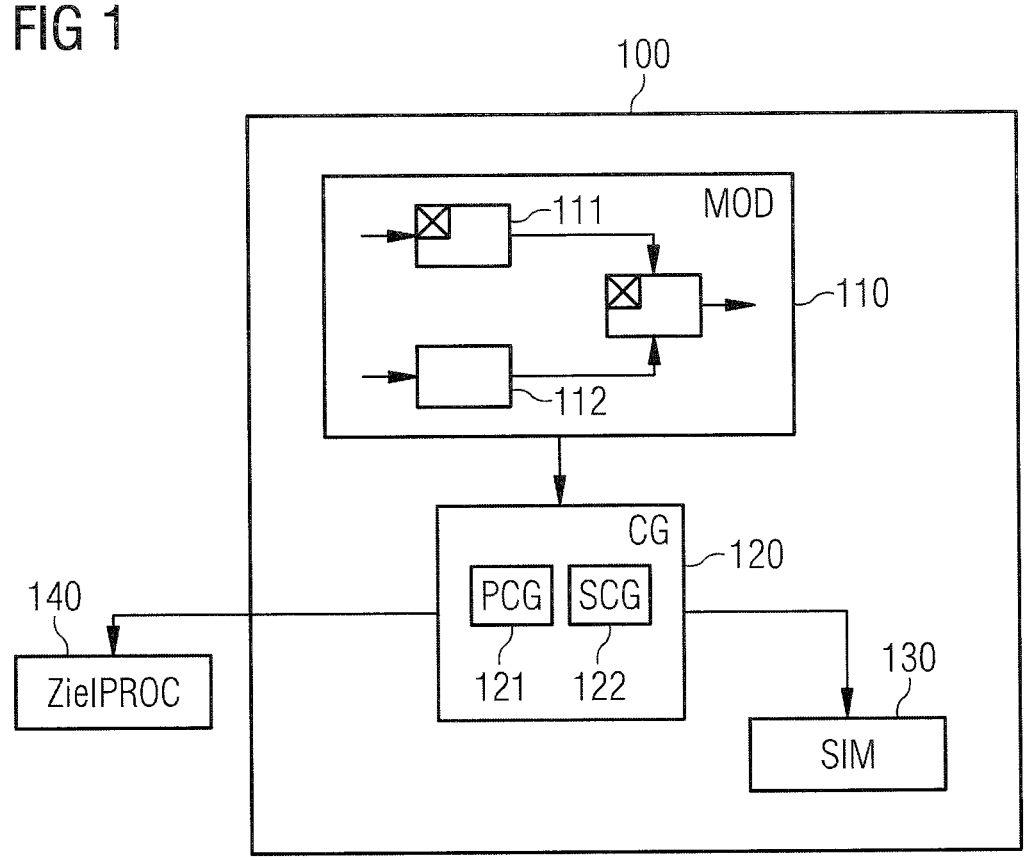
FIG. 1 is a schematic view of the model-based environment for developing and testing programs according to the invention.

FIG. 1 schematically shows the structure of a model-based environment 100 for developing and testing control programs, in particular control programs for ECUs.

The model-based development and test environment 100 comprises a code generator (CG) 120 and a simulator (SIM) 130.

In addition, the development and test environment can include a model editor (MOD) 110. The model editor 110 can provide a graphical user interface for creating and modifying block diagrams, which preferably describe or model the dynamic, time-dependent behavior of a system or program. For example, the blocks can describe finite program states and conditions for transitions between states, in keeping with Stateflow, or operations on signals that are performed cyclically at a given frequency, as known from Simulink.

A block can describe an atomic operation, like an arithmetic calculation or a logical expression, or it can represent a subsystem, which is described more detailed by another block diagram in a subordinated level of the hierarchy. Thus, the functionality of a hierarchical block is defined by a multitude of blocks in a subordinate level.

Alternatively, it can contain code in a programming language, in particular a dynamic language intended for mathematical programming, which realizes the functionality of the block. Several blocks can be connected by signals for data exchange. For example, an output block can receive a signal of type Single as an input signal (in other words, a block parameter for code generation), modify the signal by adding a constant, for example, and send an output signal of type Double to another block. In other words, two blocks can be connected by a signal path or signal line so that data flows from the first block to the next block, as known from Simulink, for example.

According to the invention, the model editor 110 offers the user the possibility to mark certain blocks with a simulation code attribute in order to distinguish between attributed blocks (block 111), which are used for simulation purposes, and blocks (block 112), which are used exclusively for generating production code.

This attribution of the blocks is taken into account by the code generator (CG) 120. The code generator 120 enables the generation of source code from the blocks of the block diagram created by the model editor 110. Due to the inventive attribution of the blocks at the model level, the generated source code contains both simulation code portions and production code portions corresponding to the respective blocks. Preferably, the code generator 120 can be of modular design, comprising a module (PCG) 121 for generating production code and a module (SCG) 122 for generating simulation code. However, it is also conceivable to provide both functionalities using a single module.

Both the production code portion and the simulation code portion can be optimized according to different criteria. For example, the code can be optimized in terms of readability, traceability, security, low energy consumption, execution speed and/or memory requirements. Preferably, the code generator provides a user interface for setting a variety of options for customizing the generated code. Customization options can include target-specific optimizations for the microcontroller of the embedded program and enforcement of the generated code's compliance with a specific standard, such as the MISRA C guidelines. A particularly preferred code generator (CG) is TargetLink by dSPACE.

The simulator (SIM) 130 can be set up to execute a block diagram created in the model editor 110 to observe the temporal behavior of the dynamic system described by the block diagram. The simulator 130 can be set up to perform both Soft-ware-in-the-Loop and Model-in-the-Loop simulation. In the first case, the Software-in-the-Loop simulation is performed taking into account the simulation code created by the code generator 120. However, for certain model blocks, a Model-in-the-Loop simulation can also be performed by directly executing the blocks. With a Model-in-the-Loop simulation, correctness can be verified at the model level, i.e. whether the blocks executed during the simulation actually describe the intended behavior of the control program. The whole model can be executed as Model-in-the-Loop simulation. However, only certain model sections, such as a plant model, can be executed in Model-in-the-Loop simulation mode, while other model sections, such as a controller code, are executed in Software-in-the-Loop simulation mode.

After successful execution of the simulation, the simulation code portion can be removed from the source code. The source code, which can now only contain production code, is preferably compiled to be executable on a target processor 140, in particular on a processor of an ECU.

FIG. 2 is a block diagram which illustrates the inventive method of generating source code from a model. The method can be run on the environment 100 shown in FIG. 1. The method is started on a model created with the model editor 110. The method in FIG. 2 is executed for each of the blocks in the model. The code generator 120 generates both production and simulation code in the same run. Simulation code is generated for blocks that have a simulation code attribute (step S10), and production code is generated for blocks that do not have a simulation code attribute (step S20).

The ability to assign a simulation code attribute to blocks and set it again in each code generation run allows for the same block to be used as a production block in one run and as a simulation block in another run.

In a further step S30, a simulation is carried out taking the simulation code into account. Preferably, this step includes a Software-in-the-Loop (SIL) simulation. However, for certain model blocks an additional Model-in-the-Loop (MIL) simulation can be performed. Known simulation environments, such as TargetLink, can be used for this purpose. TargetLink, in cooperation with MATLAB/Simulink, provides various simulation modes for this purpose. The MIL simulation serves in particular as a reference for the SIL simulation.

The SIL simulation can be performed on a host PC, taking into account the simulation code and, if necessary, the results of the MIL simulation, in order to com-pare the behavior of the generated code with the reference data obtained during the MIL simulation.

In addition to the MIL and SIL simulation, a Processor-in-the-Loop (PIL) simulation can also be performed. This can be performed on an evaluation board equipped with a processor that corresponds to the processor on the ECU. The combined use of the three simulation modes ensures the correctness of the generated source code.

Figure 3A:
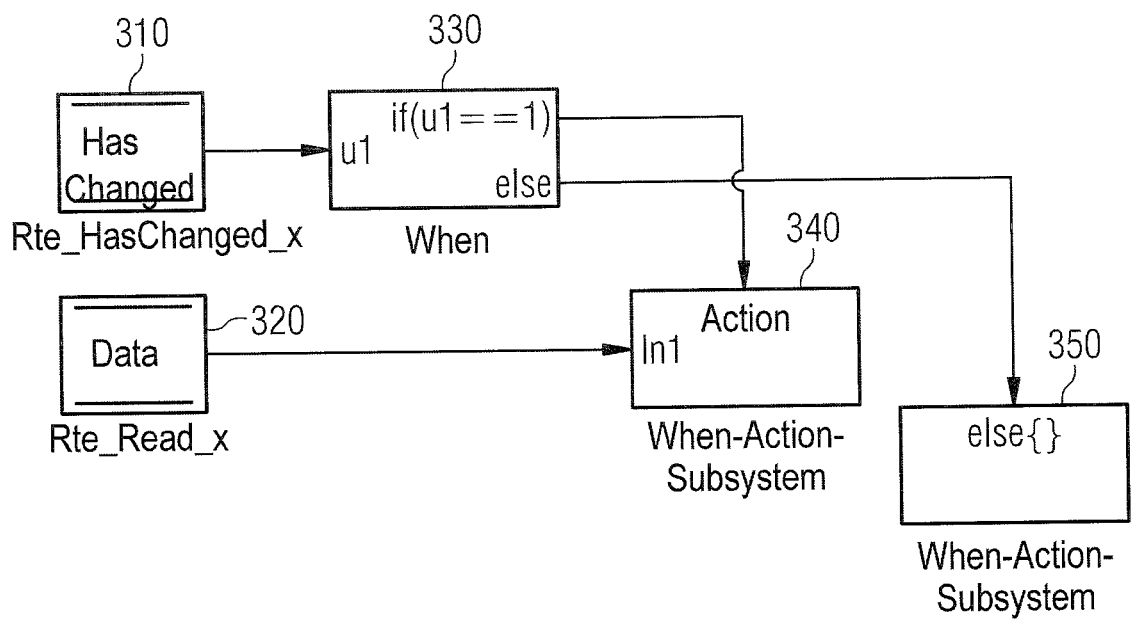
FIGS. 3A, 3B and 3C show an embodiment of the invention for simulating the interaction between an AUTOSAR model and a runnable of another software component executed in parallel
Figure 3B:
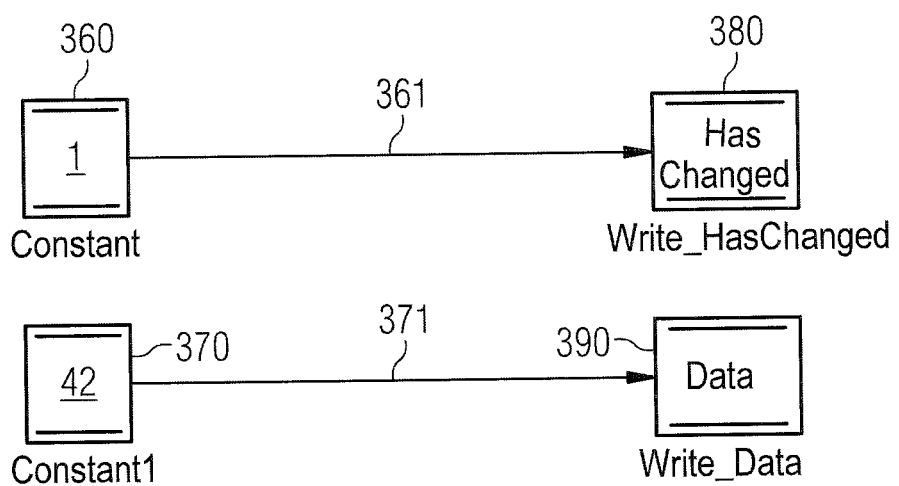
Figure 3C:
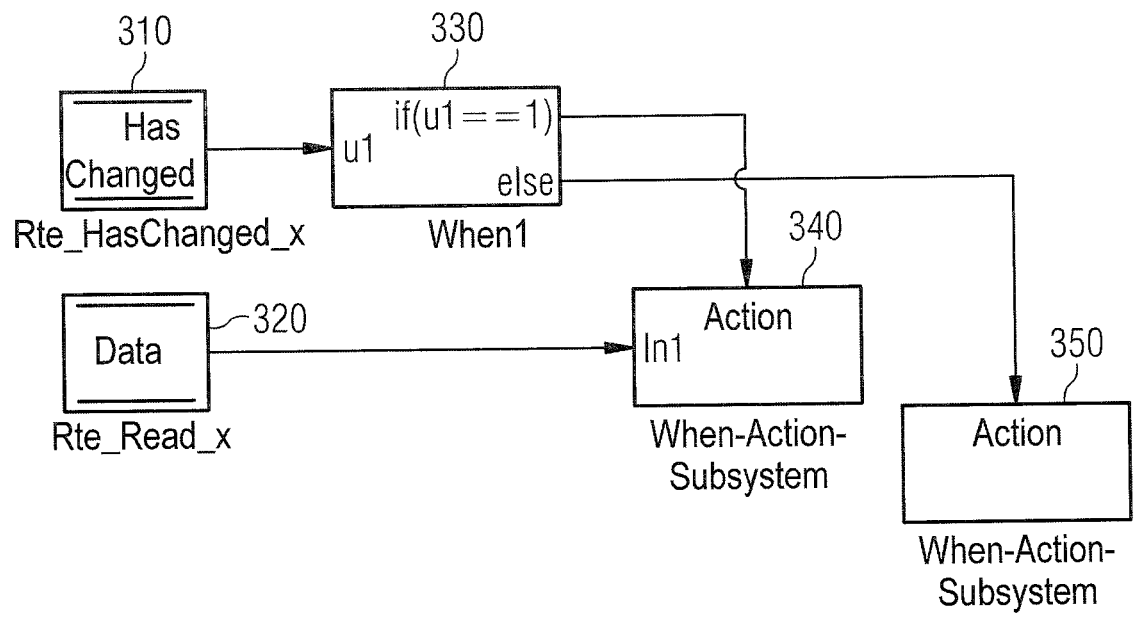

FIGS. 3A to 3C show an embodiment according to the invention in which a runnable of a software component of an AUTOSAR system is described. The influence of a runnable of another software component executed in parallel is simulated on the runnable described in the Simulink model. The basic assumption is that the block groups shown are executed in the order specified in the groups. This can be controlled in MATLAB/Simulink by block priorities.

FIG. 3A shows a Simulink model that describes the following behavior: The value of a data element x is read by the "Data Store Read" block Rte_Read_x 320 from the "Data Store Memory" block (not shown here). At the same time, a value is read from another "Data Store Memory" block by the "Data Store Read" block Rte_hasChanged_x 310, which indicates whether the value of the data element x has changed. Preferably, this is a Boolean value. If the value has changed, block 330, an action specified by block 340 is executed. If the value of the data element has remained unchanged, the action specified by block 350 is executed.

Here, the value of the data element x is changed by a runnable of an SW component executed in parallel. The behavior of this additional SW component is described by the model in FIG. 3B. All four blocks in FIG. 3B are attributed as simulation blocks, i.e. they are provided with a simulation code attribute. Blocks 360 and 370 each generate an output signal with a constant value, wherein the output signals are passed on as input signals 361, 371 to blocks 380 and 390, respectively. Signal line 371 models the writing of a new value of x, i.e., the new value of data element x is written by the "Data Store Write" block Write_Data 390 in the "Data Store Memory" block (not shown here). The signal line 361 models a corresponding change in the state of the "Data Store Write" block Write_hasChanged 380, whereby a new value is written in the Data Store Memory block, indicating whether the value of the data element x has changed.

FIG. 3A and FIG. 3C show portions of the same runnable executed one after the other. FIG. 3B shows a model portion that models the influence of another runnable executed in parallel and is executed between the model portions in FIG. 3A and FIG. 3C. FIG. 3C shows model portions that are influenced by the runnable executed in parallel.

Figure 4A:
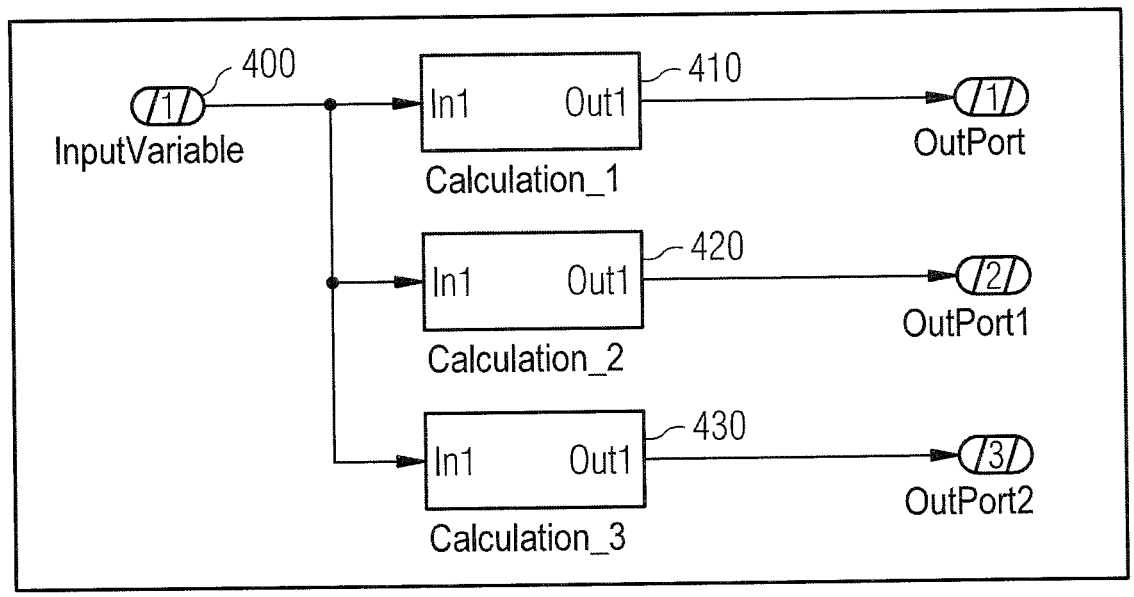
Figure 4B:
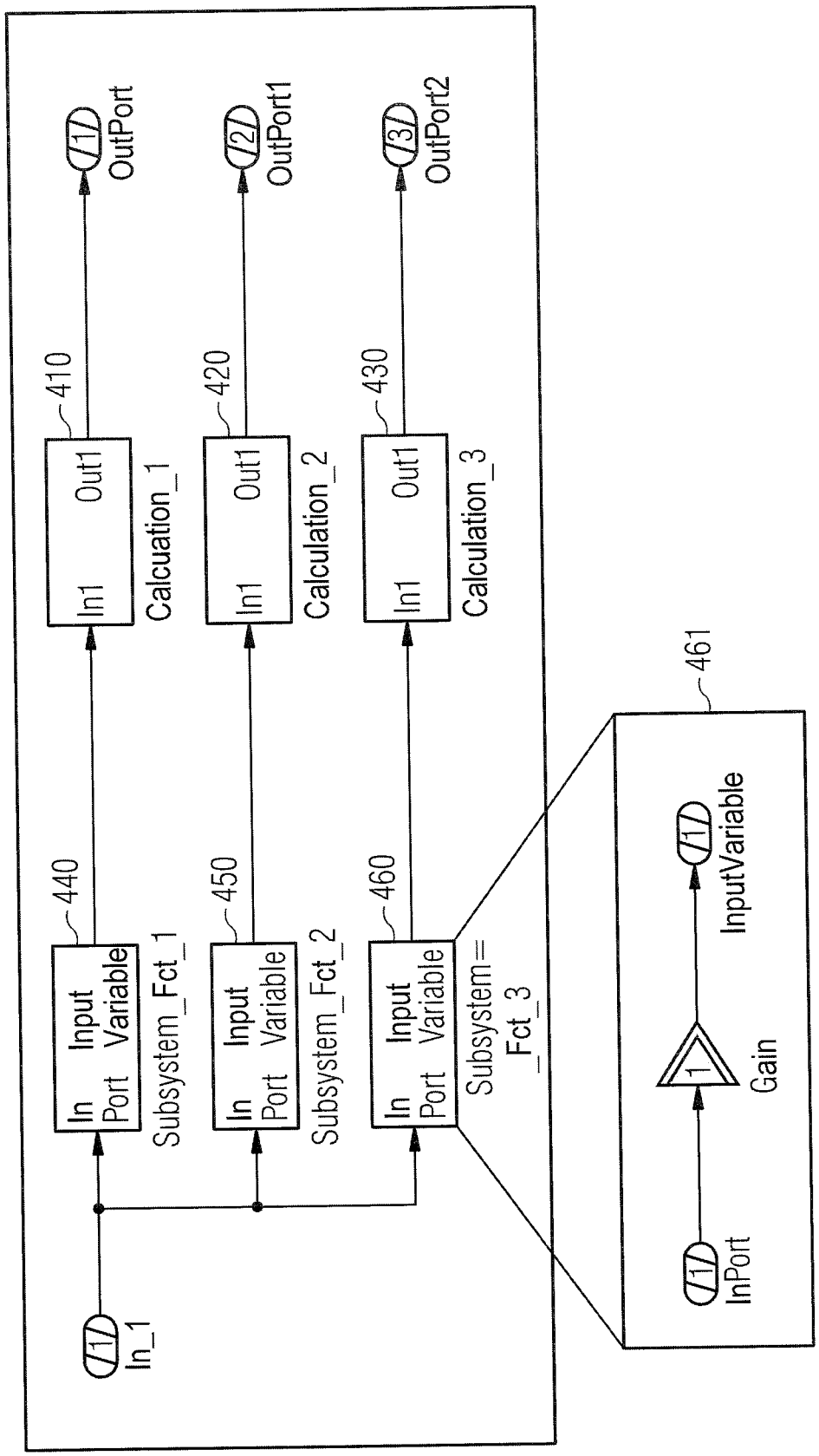
Figure 4C:
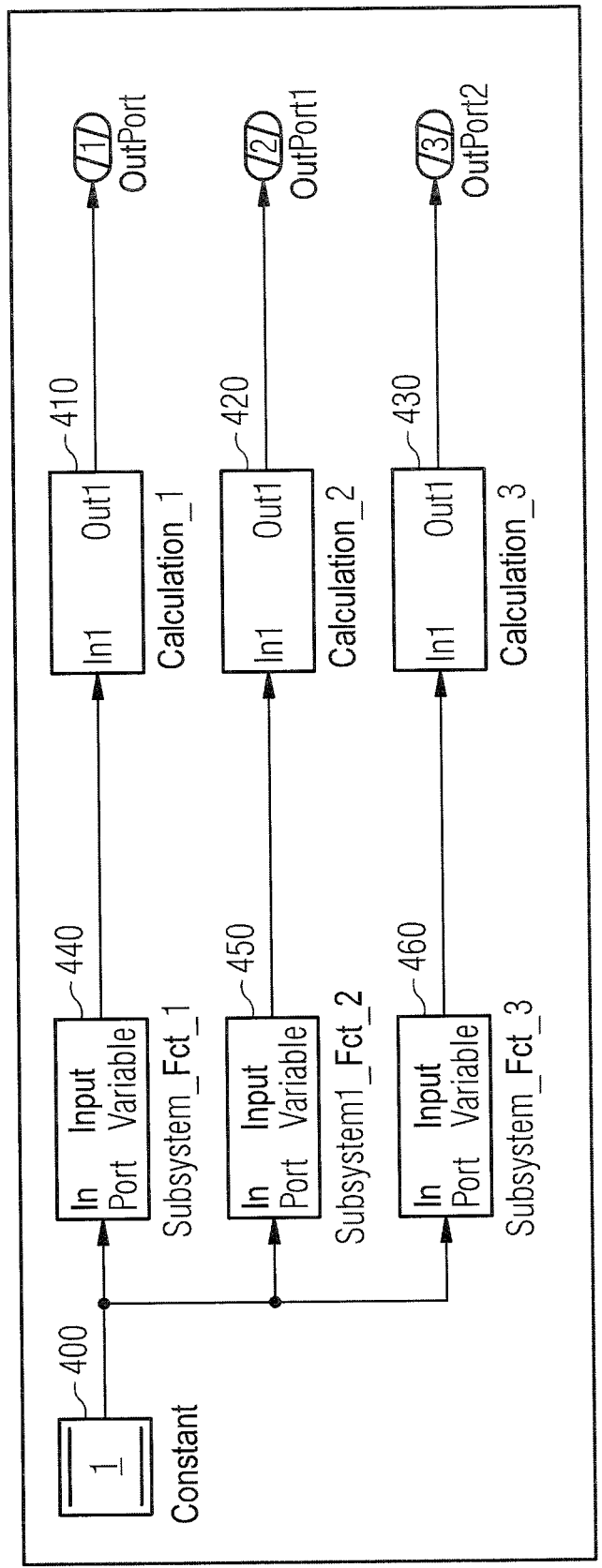
Figure 5:
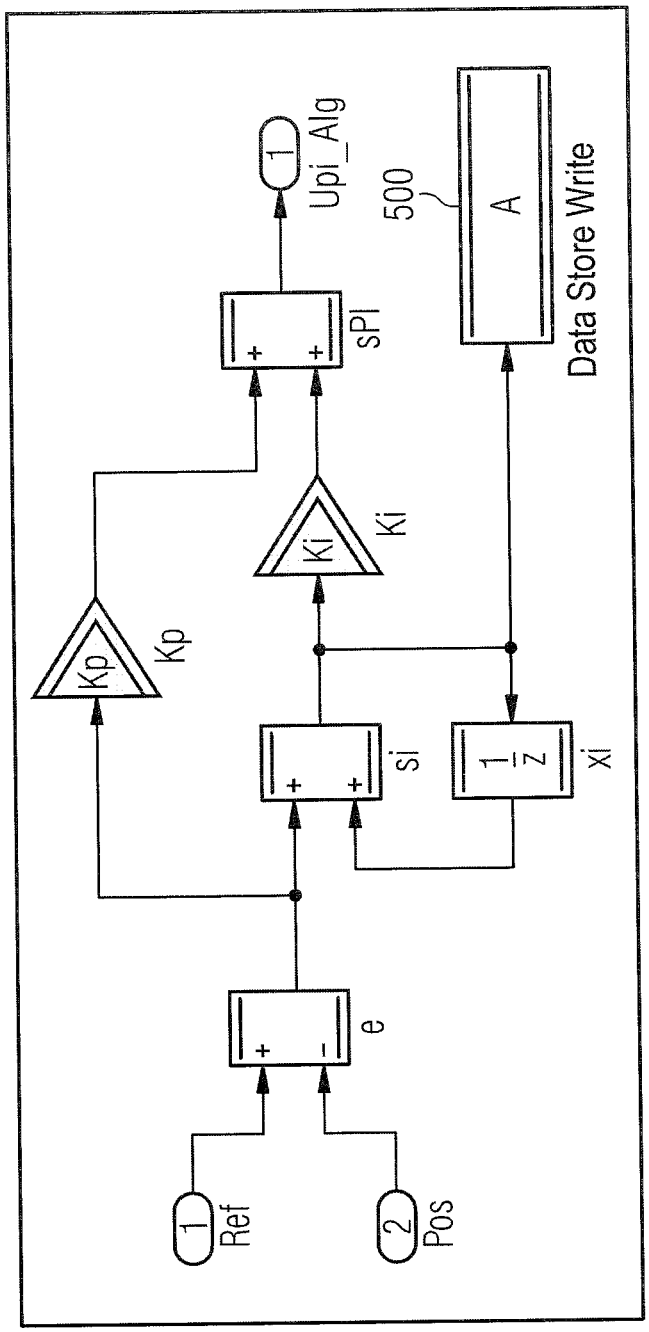
FIG. 5 shows an embodiment of the invention for signal injection and tunneling.

Further embodiments of the invention with examples for the generation of source code are shown in FIGS. 4 to 6.

The embodiment shown in FIGS. 4A to 4D is an example of signal manipulation, where a value is to be read from a memory location, which can be changed by external processes.

FIG. 4A illustrates conventional modeling, where production code is generated exclusively from blocks 410, 420, 430, in the form of Int16 volatile*pInputVariable=(Int16 volatile*)0x1111;
OutPort_Var=Calculation_1(*pInputVariable);
OutPort1_Var=Calculation_2(*pInputVariable);
OutPort2_Var=Calculation_3(*pInputVariable);

The value of the variable InputVariable is read in via port 400, and is thus fixed in blocks 410, 420, 430 for all further calculations. A simulation can only be realized by overwriting the variable InputVariable with a new value via port 400 for each simulation step. However, all calculations (Calculation_1 to Calculation_3) are performed with this same value. With the above approach, it is therefore not possible to simulate that the value of InputVariable changes within a scanning step in order to be able to perform each calculation with a different value of the InputVariable.

This flexibility can be achieved by attributing blocks as simulation blocks according to the invention. FIG. 4B shows an inventive extension of the model from FIG. 4A, in which additional simulation blocks, i.e., blocks 440, 450, 460 with a simulation code attribute are added. Simulation code is generated for each of these blocks and production code is generated for the remaining blocks 410, 420, 430.

The blocks identified by the simulation code attribute are specified in more detail by further blocks 461 in an underlying model level. Thus, the user can model different algorithms in block 461, which specifies the subsystem subsystem_fct_<n>, which transform the input signal.

This example takes advantage of the fact that ports can be used as transition blocks between simulation and production code. The InputVariable modeled as Input-Port in FIG. 4A serves as the boundary between Simulation Code Blocks 440, 450, 460 and Production Code Blocks 410, 420, 430 in the inventive modeling in FIG. 4B.

The following source code is generated from the model shown in FIG. 4B using the method shown in FIG. 2:

```
Int16 volatile * pInputVariable = (Int16 volatile *) 0x1111;
#ifdef SIMULATION
/* Calculation of the subsystem: Subsystem_Fct_1 */
*pInputVariable = <Subsystem_Fct_1> (In1_1);
#endif
OutPort_Var = Calculation_1(*pInputVariable);
#ifdef SIMULATION
/* Calculation of the subsystem: Subsystem_Fct_2 */
```

```
*pInputVariable = <Subsystem_Fct_2>(In1_1);
#endif
OutPorti_Var = Calculation_2(*pInputVariable);
#ifdef SIMULATION
/* Calculation of the subsystem: Subsystem2_Fct_3 */
*pInputVariable = <Subsystem_Fct_3 >(In1_1);
#endif
OutPort2_Var = Calculation_3(*pInputVariable);
```

The above source code contains both simulation code and production code portions. The simulation code portions can be separated from the production code portions, marked or bracketed by preprocessor directives (#ifdef,#endif).

In contrast to the source code generated from the model in FIG. 4A, the above code allows for the value of the InputVariable to be changed during a single simulation step. Here, the new value is calculated using blocks 440, 450, 460, 461. In the generated code file, the code for these blocks is expressed as simulation code.

An alternative modeling of the embodiment from FIG. 4B is shown in FIG. 4C. Instead of a InPort block on the top level (In1_1), as used in FIG. 4B, a constant block 400 can be used. Instead of the constant block, a "Data Store Read" block could also be used (and a corresponding "Data Store Memory" block defined). This means that the input for the subsystems Subsystem_Fct_1 to Subsystem_Fct_3 does not necessarily have to be routed to the root subsystem, as is the case with the modeling approach in FIG. 4B. Instead, the stored value can be changed by signal injection, which the user performs in a separate model portion. For example, code generation can be done only for one TargetLink subsystem, while the signal change is modeled outside.

It is also possible to specify the different values of the InputVariable directly, as shown in the alternative embodiment of FIG. 4D. Three values for the InputVariable are specified directly as constants 1, 2 and 3 via in each case three simulation blocks 440, 450 and 460 and the respective subsystem blocks 461.

From the model in FIG. 4D, the following source code is generated using the method according to the invention:

```
Int16 volatile * pinputVariable = (Int16 volatile *) 0x1111;
#ifdef SIMULATION
/* Define the output variable of the block constant */
Int16 Constant_1_Var = 3;
Int16 Constant_2_Var = 2;
Int16 Constant_3_Var = 1;
#endif
...
#ifdef SIMULATION
/* Calculation of the subsystem: Subsystem_Fct_1 */
*pInputVariable = constant_1_Var;
#endif
OutPort_Var = Calculation_1(*pInputVariable);
#ifdef SIMULATION
/* Calculation of the subsystem: Subsystem_Fct_2 */
*pInputVariable = constant_2_Var;
#endif
OutPort1_Var = Calculation_2(*pInputVariable);
#ifdef SIMULATION
/* Calculation of the subsystem: Subsystem2_Fct_3 */
*pInputVariable = constant_3_Var;
#endif
OutPort2_Var = Calculation_3(*pInputVariable);
```

For each new simulation step, the new value of constant_1_Var to constant_3_Var can be set via a signal injection mechanism. This writing can be carried out in a similar way to the reading explained below with reference to the embodiment shown in FIG. 5.

FIG. 5 shows the initial situation of an embodiment for tunneling according to the invention, which can also be used for signal injection.

The Data Store Write Block 500 is marked as simulation block and the simulation variable generated for the Data Store Write Block is declared as a global variable.

This is illustrated by the following source code, which is generated from the model in FIG. 5 by means of the inventive method according to FIG. 2.

```
#ifdef SIMULATION
< DataType> DataSaveWriteVariable;
#endif
Void foo(void)
{
< DataType> VariableToBeTunneled ...
/* Calculate the value of the local production code variable
VariableToBeTunneled */
VariableToBeTunneled = ....
#ifdef SIMULATION
DataMemoryWriteVariable = VariableToBeTunneled ;
#endif
}
```

The above source code contains both simulation code and production code portions. The simulation code contains a global simulation variable, DataSaveWriteVariable, the value of which is determined by a value of a local variable VariableToBeTunneled in the production code.

With the approach of attributing certain blocks as simulation code blocks according to the invention, local variables can be read or written.

Figure 6A:
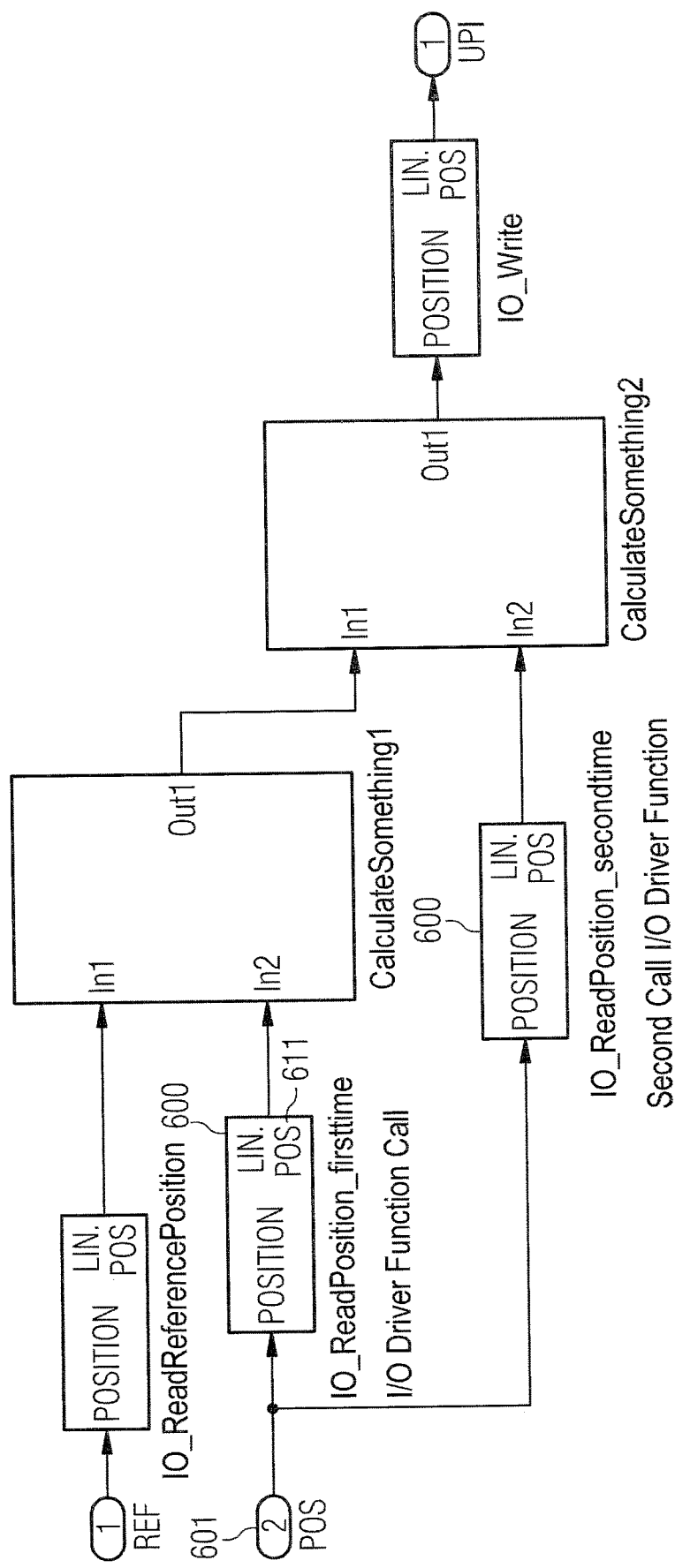

A further embodiment of the invention is shown in FIGS. 6A and 6B. In this embodiment, several calls to a software component, in particular a driver, are integrated into the model by means of simulation blocks, as shown by the blocks 600 in FIG. 6A. Here, the Pos-signal 601 can be designed as a vector whose different elements each provide the value for a driver call. The implementation of the driver is emulated by simulation code.

FIG. 6B shows the subsystem 600 for the driver call, comprising a simulation code section 610 and a production code section 620. This subsystem 600 can then be implemented as a selection of the corresponding section to describe the variable LinPos 611 with different values, namely a value 611-1 for simulation code and a value 611-2 for production code. The variable LinPos is thus modeled as an outport with two identities, i.e. for use in the simulation code 611-1 and for use in the production code 611-2.

For a better separation of the code portions, it is expedient to "push" the simulation code out of the production code subsystem. This allows for the simulation code to be swapped out into separate code modules and a module for production code does not contain any simulation code portions.

For example, the simulation code module for the driver call contains the following code section, which is generated from simulation code section 610 in FIG. 6B.

```
/***************************************/
/* Module IORead.c - simulation code */
/***************************************/
Int16 Position [2];
UInt16 current_Idx = 0;
Void IO_ReadPosition(Int16 * LinPos)
```

```
{
*LinPos =Position [current_Idx];
current_Idx += 1;
}
```

For example, the production code module for the driver call contains the following code section, which is generated from production code section 620 in FIG. 6B.

```
/****************************************/
/* Module IORead.c - production code */
/****************************************/
CAL UInt16 channel = 3;
void IOReadPosition(Int16 * LinPos)
{
*LinPos = Read value from hardware (channel);
}
```

Further sub-modules, such as a module for initialization and a module for the individual function calls, can also be generated.

```
Initialization - Stub module 1:
Pos[0] = 1;
Pos[1] = 2;
...
Pos[n]=123;
Stub function - Stub module 2:
IOReadPosition(& LinPos, IO_Channel_3)
{
static ReadIdx = 0;
LinPos = Pos [ReadIdx];
ReadIdx += 1;
}
Production code with call of the I/O driver:
...
#include IORead.h
void myProdCode ()
{
...
/* first call I/O driver */
IOReadPosition(& LinPos, IO_Channel_3);
/* Start calculation - CalculateSomething1 */
...
/* second call I/O driver */
IOReadPosition(& LinPos, IO_CHANNEL_3);
/* Continue calculation - CalculateSomething2 */
...
};
```

The initialization module is part of the simulation code and is used to initialize parameters and/or variables of the emulated component (e.g. the driver 600 in FIG. 6B). The function module contains stub functions of the emulated component, wherein function calls of one or more stub functions are made in the production code.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for generating source code from a model, said model comprising one or more blocks specifying a desired behavior of a program, the method comprising:
generating a simulation code for all blocks of the model that include a simulation code attribute, the simulation code being a portion of the source code for emulation of one or more components that influence the program for execution on a control unit;
generating a production code for all blocks of the model that do not include the simulation code attribute, the production code being a portion of the source code for the program;
performing, subsequent to generating the simulation code and generating the production code, a simulation of the program taking the simulation code into account, the simulation code being used to test the program; and
discarding the simulation code and compiling the production code for execution on a processor or on a processor of the control unit,
wherein the simulation code and the production code are contained in the source code separably from each other, and
wherein the production code and the simulation code are generated from the model in a single code generation run.

2. The method according to claim 1, wherein the simulation code is integrated into the source code through preprocessor directives.

3. The method according to claim 1, wherein the simulation code is stored separately from the production code in a code module or code file.

4. The method according to claim 1, wherein the simulation is a Software-in-the-Loop simulation, taking the simulation code into account.

5. The method according to claim 1, wherein a particular block of the one or more blocks comprising the simulation code attribute comprises at least one further attribute which is taken into account in the generation of the simulation code.

6. The method according to claim 5, wherein generating the simulation code comprises optimizing the simulation code taking into account the at least one further attribute.

7. The method according to claim 1, wherein generating the simulation code comprises generating a stub function emulating a component interacting with the program by the corresponding simulation code.

8. The method according to claim 1, wherein generating the simulation code comprises generating function calls for transforming an input signal.

9. The method according to claim 8, wherein the simulation code replaces the function calls which assign a value to a local variable occurring in the production code.

10. The method according to claim 1, wherein the simulation code includes a global simulation variable whose value is determined by a value of a local variable calculated in the production code.

11. The method according to claim 1, wherein the production code includes a local variable whose value is determined by a value of a global variable calculated in the simulation code.

12. The method according to claim 1, wherein the simulation code includes:
an initialization module which initializes parameters and/ or variables of an emulated component, and
a function module for receiving functions or stub functions, of the emulated component, wherein function calls are made in the production code.

13. The method according to claim 1, further comprising:
starting from a first block comprising a simulation code attribute;

verifying that all successive blocks along a continuous simulation line passing from the first block to a block marked as a transition block comprise simulation code attributes; and generating an error message if a corresponding simulation code attribute of a particular block of the successive blocks is not set.

14. The method according to claim 1, wherein the production code is for execution on a processor of an electronic control unit (ECU).

15. The method according to claim 1, wherein the simulation code and the production code are generated in a same programming language.

16. A code generator comprising a processor for generating source code from a model, said model comprising one or more blocks specifying a desired behavior of a program, wherein the code generator is adapted to generate simulation code for all blocks of the model comprising a simulation code attribute, the simulation code being a portion of the source code for emulation of one or more components that influence the program for execution on a control unit, generate production code for all blocks of the model not comprising the simulation code attribute, the production code being a portion of the source code for the program, perform subsequent to generating the simulation code and generating the production code, a simulation of the program taking the simulation code into account, the simulation code being used to test the program, and discard the simulation code and compile the production code for execution on a processor or on a processor of the control unit, wherein the simulation code and the production code are contained in the source code separably from each other, and wherein the production code and the simulation code are generated from the model in a single code generation run.

17. The code generator according to claim 16, wherein the production code is for execution on a processor of an electronic control unit (ECU).

18. A test environment comprising a processor for testing models for control programs, wherein a model has one or more blocks which specify a desired behavior of a control program, wherein the test environment comprises a code generator configured to generate simulation code for all blocks of the model comprising a simulation code attribute, the simulation code being a portion of the source code for emulation of one or more components that influence the control program for execution on a control unit, generate production code for all blocks of the model not comprising the simulation code attribute, the production code being a portion of the source code for the control program, perform subsequent to generating the simulation code and generating the production code, a simulation of the program taking the simulation code into account, the simulation code being used to test the program, and discard the simulation code and compile the production code for execution on a processor or on a processor of the control unit, wherein the simulation code and the production code are contained in the source code separably from each other, wherein the production code and the simulation code are generated from the model in a single code generation run, and wherein the test environment further comprises a simulator set up to perform a simulation of the model taking into account the blocks with the simulation code attribute.

19. The test environment according to claim 18, wherein the production code is for execution on a processor of an electronic control unit (ECU).

* * * * *